No. 789,122. PATENTED MAY 2, 1905.
W. DOUGLASS.
CARRIER CHAIN.
APPLICATION FILED MAY 28, 1904.
2 SHEETS—SHEET 1.
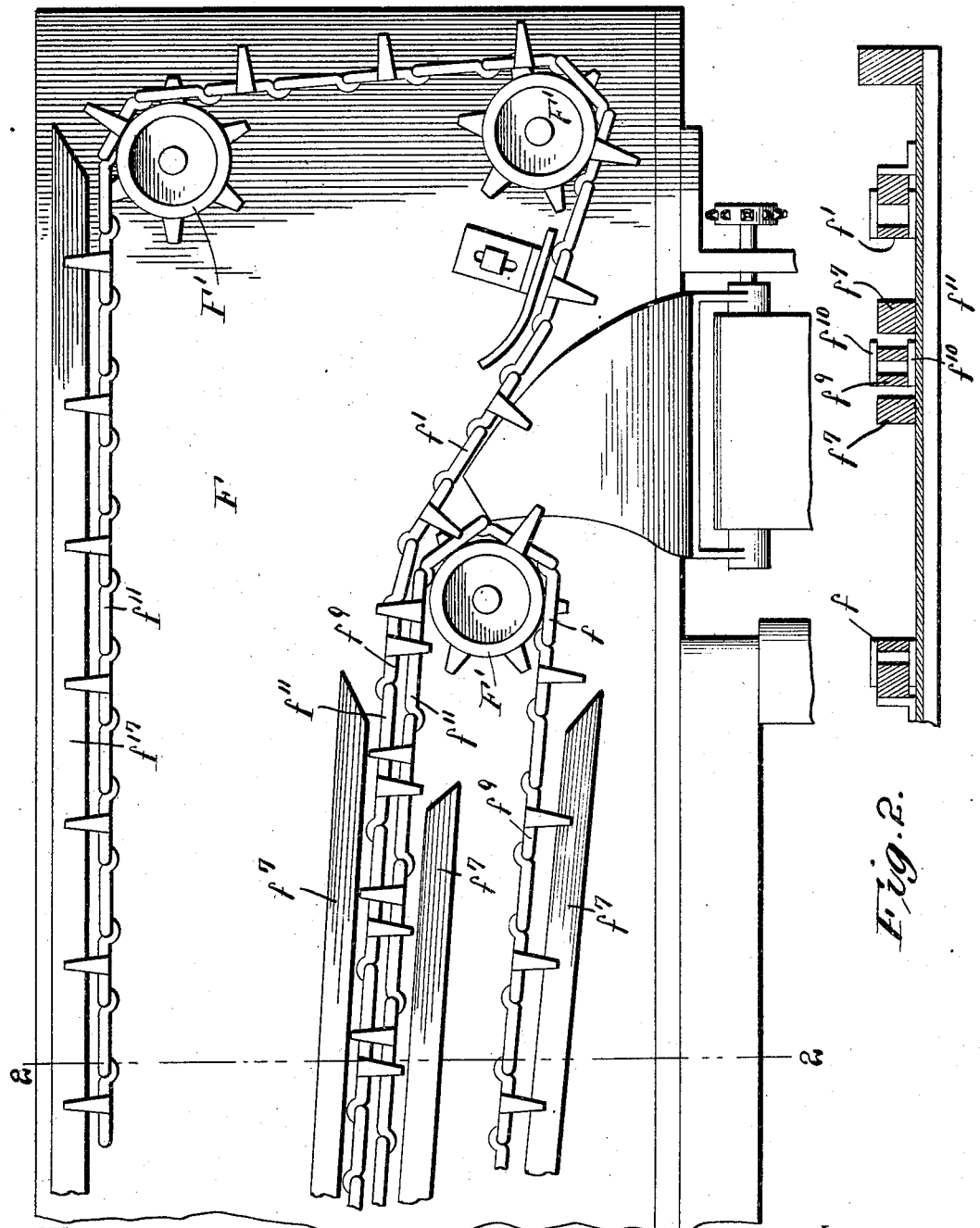

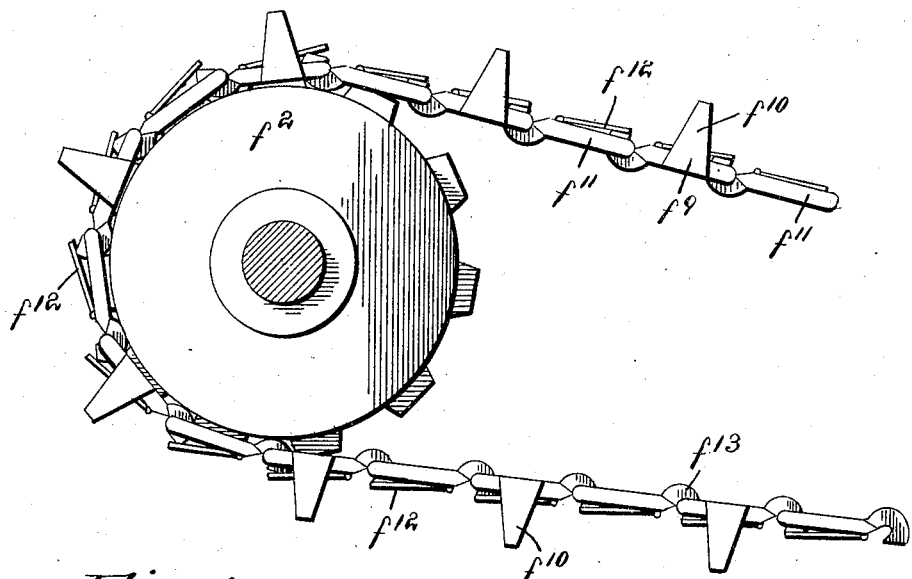
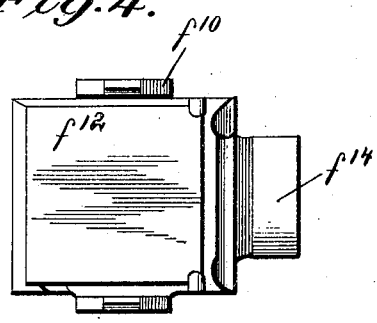
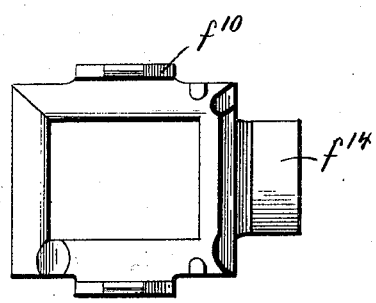
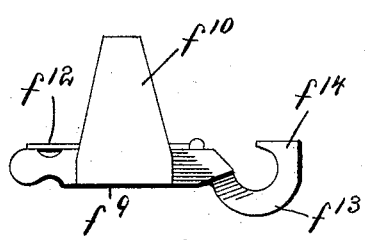

No. 789,122. Patented May 2, 1905.

UNITED STATES PATENT OFFICE.

WILLIAM DOUGLASS, OF PHILLIPSBURG, KANSAS.

CARRIER-CHAIN.

SPECIFICATION forming part of Letters Patent No. 789,122, dated May 2, 1905.

Original application filed June 14, 1902, Serial No. 111,721. Divided and this application filed May 28, 1904. Serial No. 210,307.

*To all whom it may concern:*

Be it known that I, WILLIAM DOUGLASS, a citizen of the United States, residing at Phillipsburg, in the county of Phillips and State of Kansas, have invented certain new and useful Improvements in Carrier-Chains, of which the following is a specification, reference being had therein to the accompanying drawings.

The present invention relates to carrier-chains adapted for use in self-binder harvesters, and this case is a division of my application for patent filed June 14, 1902, Serial No. 111,721, in which case the carrier-chain forming the subject of the present application is shown as an element of a harvester of the self-binder type, in which the said chains are utilized to compress and convey the straw which is to form the tying-band from the cutting apparatus to the band-twister.

While the carrier-chain which forms the subject-matter of the present case is primarily intended for use in the harvester shown and described in my aforesaid application, it will be understood that said carrier-chain may be used in any harvester where it is desired to convey the straw, or, in fact, the carrier-chain which I have invented may be used wherever it is desired to handle and carry strands of material from one point to another in compacted form, and while I shall describe my carrier-chain hereinafter as adapted for handling straw in a self-binder harvester I do not limit myself to this particular use of the chain or to its use in the particular type of harvester shown in my aforesaid application.

In order that the invention may be better understood by those skilled in the art, I have illustrated one embodiment of it in the accompanying drawings, in which—

Figure 1 is a view of a chain conveyer adapted for handling straw or similar material and carrying it from one point to another. Fig. 2 is a cross-section on line 2 2 of Fig. 1 to show the interlocking arrangement of the carrier-chains with each other. Fig. 3 is an enlarged detail view of one of the carrier-chains. Figs. 4, 5, and 6 are detail views of the chain-links.

Referring to the drawings by letters, like letters indicating like parts in the several views, F indicates any suitable support for carrying the conveyer-chains and their operating devices, such as the sprocket-wheels $F'$ shown in the present case. The chains $f$ $f'$ when assembled in carrying position lie side by side, as shown in Fig. 1, so that they will seize and carry any material, such as straw, which may be fed into them from one point to another, said chains when assembled in the carrier, as shown in Fig. 1, being driven by sprocket-wheels, which may be actuated from any suitable source of power, means, such as guide-strips $f^7$, being provided to hold the chains in close compacting and conveying relation. The said chains $f$ $f'$ are made up of what may be termed "carrier-links" and plain "connecting-links" intermediate the carrier-links. The said carrier-links $f^9$ are shown in detail in Figs. 4, 5, and 6 and are characterized by lugs $f^{10}$, projecting from the side members of the links at right angles thereto, said lugs $f^{10}$ embracing the intermediate connecting-links $f^{11}$ of the adjacent conveyer when the chain grasps the straw or other material, and so form interlocking carrying and compressing chains, which completely inclose the straw or other material and prevent its escape from between the chains, the two chains $f$ $f'$ being so arranged as that each carrier-link $f^9$ is opposed to and interlocks with a plain connecting-link of the other chain when the chains come together.

To guard against danger of the straw or other material becoming entangled with the outer chain $f'$, due to the ends of the straw or loose strands sticking through the open links of the chain as it is delivered thereto at an angle to the line of movement of the chains, (see Fig. 1,) I preferably cover said links by means of spring-plates $f^{12}$, which are secured at their rear ends to the links, as shown in Figs. 3, 4, and 5, said plates $f^{12}$ being thrown outwardly by the action of the links as the chains pass over the sprocket-wheels (see Fig. 3) at the delivery end of the carrier and serving to direct the straw or other material to the point of delivery by springing away slightly from their links as the chain rounds the sprocket-wheel $f^2$ and breaking any beards, straw, or any other strands that may have become caught in the chain, thus preventing the straw from being carried around and entangling the sprocket-wheels with the chain instead of passing to the proper point of delivery. In order to throw the said spring-plates $f^{12}$ outwardly as the chain is flexed in passing around the sprocket-wheel or other driving devices, I preferably form the knuckle $f^{13}$ of the chain as shown in Figs. 3 and 5, giving said knuckle a flat bearing-surface $f^{14}$, upon which the free end of the spring-plate $f^{12}$ normally rests when the chain is traveling in a straight line, which knuckle, when the chain passes around the sprocket or is flexed, will project through the opening in the link and move the spring-plate away from the link, as shown in Fig. 3, thus serving by its movement of the spring-plate to break or disentangle any strands or straw-beards which may have caught in the links. If desired, the chain $f$ may be similarly covered, but as the straw does not in practice feed against said chain as it does against chain $f'$ such covering is not deemed necessary.

From the foregoing it will be seen that I have provided a compressing and carrying chain which is capable of handling straw or similar material, conveying it from one point to another, and eliminating all danger of catching or entangling of the strands or fibers with the carrier-chains, and while I have shown and described a particular construction of chain I wish it to be distinctly understood that the showing and description is merely illustrative of one embodiment of my invention and that I do not limit myself to any of the details of construction shown and described, except so far as I am limited by the terms of the appended claims.

Having thus described my invention, I claim and desire to secure by Letters Patent—

1. A chain conveyer comprising carrier-chains in close carrying relation to each other, one at least of said chains having carrier-links provided on their upper sides with integral carrying-lugs adapted to straddle the links of the opposing chain and support the material between the chains; and means for guiding said chains and maintaining them in interlocked position through a portion of their travel.

2. A chain conveyer comprising carrier-chains in close carrying relation to each other, carrier-links in said chains provided with lugs adapted to straddle the links of the opposed chain, and guide-rails between which said chains run and by which they are held in interlocked relation.

3. A chain conveyer comprising carrier-chains in close carrying relation to each other, said chains being made up of plain links and carrier-links alternating with said plain links and provided with carrier-lugs projecting at substantially right angles to the plane of the link, and having the carrier-links opposed to and straddling the plain links of the opposing chain, and guide-rails to hold the chains in interlocked relation.

4. A chain conveyer comprising endless carrier-chains in close carrying relation to each other, and chains being made up of plain links and carrier-links alternating therewith and provided with carrier-lugs projecting at substantially right angles to the plane of the link and having the carrier-links opposed to and straddling the plain links of the opposing chain, guide-rods to keep the opposed runs of the said chains in interlocked relation, and guide-rails embraced by the carrier-lugs to support the outer runs of the chains.

5. A carrier-chain formed of open links having covering-plates secured to one end only and closing the openings in said links.

6. A carrier-chain composed of open links having spring covering-plates to close the openings in said links.

7. A carrier-chain composed of open links and having spring covering-plates secured at one end only to close the openings in said links.

8. A carrier-chain composed of open links having carrier-lugs projecting from either side of the links at substantially right angles thereto and spring covering-plates secured at one end only to close the openings in said links.

9. A carrier-chain composed of open links, spring covering-plates secured at one end only to each of said links, and means to throw the free ends of said spring-plate away from the links when the chain is flexed.

10. A carrier-chain composed of open links, spring covering-plates secured at one end only to each of said links, and means carried by said links to throw the free ends of said spring-plates away from the links when the chain is flexed.

11. A carrier-chain composed of open links, spring covering-plates secured at one end only to each of said links to close the openings therein, each of said spring-plates resting at its free end on the knuckle of the next succeeding link, whereby said spring-plates will be thrown outwardly away from the link by said knuckle when the chain is flexed.

12. A carrier-chain composed of open links, spring covering-plates secured at one end only to each of said links to close the openings therein, and coupling-knuckles adapted to be moved against the free ends of said spring-plates when the chain is flexed, whereby said spring-plates will be thrown outwardly away from the link.

13. An open link for carrier-chains having a carrier-lug projecting from the side thereof at substantially right angles to the plane of the link, and a plate covering the opening in said link.

14. An open link for carrier-chains having carrier-lugs projecting from each side thereof at substantially right angles to the plane of the link, and a spring-plate secured at one end only to said link and covering the opening in said link.

15. A link for carrier-chains having a knuckle provided with a substantially flat bearing-surface, and an angular rear end adapted to be projected beyond the plane of the chain when the chain is flexed.

In testimony whereof I affix my signature in presence of two witnesses.

WILLIAM DOUGLASS.

Witnesses:
  HENRY CALVER,
  A. V. CUSHMAN.